United States Patent
Riester et al.

(10) Patent No.: US 7,490,851 B2
(45) Date of Patent: *Feb. 17, 2009

(54) VEHICLE DOOR TRIM AND METHOD FOR THE MANUFACTURE THEREOF

(75) Inventors: Christo Riester, Oberding/Aufkirchen (DE); Michael Dax, Altfraunhofen (DE); Friedrich Graf, Eggenfelden (DE); Lutz Lehman, Ergolding (DE); Georg Sigl, Arnstorf (DE); Marc Sieber, Landshut (DE); Thomas Sperl, Landau/Isar (DE)

(73) Assignee: Lisa Dräxlmeier GmbH, Vilsbiburg (DE)

( * ) Notice: Subject to any disclaimer, the term of this patent is extended or adjusted under 35 U.S.C. 154(b) by 44 days.

This patent is subject to a terminal disclaimer.

(21) Appl. No.: 11/368,331

(22) Filed: Mar. 3, 2006

(65) Prior Publication Data

US 2006/0197322 A1 Sep. 7, 2006

(30) Foreign Application Priority Data

Mar. 4, 2005 (DE) .................. 10 2005 010 024

(51) Int. Cl.
*B60R 21/16* (2006.01)
(52) U.S. Cl. .................................................. 280/730.2
(58) Field of Classification Search .............. 280/730.2, 280/730.1, 728.3, 728.2
See application file for complete search history.

(56) References Cited

U.S. PATENT DOCUMENTS

| 5,231,253 A | 7/1993 | Breed et al. |
| 5,308,112 A | 5/1994 | Hill et al. |
| 5,443,777 A | 8/1995 | Mills |

(Continued)

FOREIGN PATENT DOCUMENTS

DE 19516230 C2 11/1996

(Continued)

OTHER PUBLICATIONS

European Search Report EP06004407, dated Jun. 1, 2006.

(Continued)

*Primary Examiner*—Faye M. Fleming
(74) *Attorney, Agent, or Firm*—Wolf Greenfield & Sacks P.C.

(57) ABSTRACT

A vehicle door trim for a motor vehicle with a head impact protection device for a vehicle occupant is provided. In one embodiment, the door trim includes a curb carrier, a head impact protection device, a foam layer over the curb carrier and a decorative layer on the side of the foam layer facing away from the curb carrier. The curb carrier may include at least one fixing attachment for fixing the head impact protection device in an area in the assembled position of the vehicle door trim that is close to the side window of the vehicle door as well as a cover area that covers the head impact protection device. The head impact protection device may include as a module, an airbag carrier, an airbag and a gas generator. The foam layer may be sufficiently elastic to deform on actuation of the head impact protection device. The cover area of the curb carrier may have a material weakening which may be adapted such that on actuation of the head impact protection device the cover area may tear open in the area of the material weakening.

23 Claims, 5 Drawing Sheets

U.S. PATENT DOCUMENTS

| | | |
|---|---|---|
| 5,868,420 A | 2/1999 | Higashiura et al. |
| 6,022,623 A | 2/2000 | Clerici |
| 6,113,131 A | 9/2000 | Uehara et al. |
| 6,199,897 B1 | 3/2001 | Kreile |
| 6,276,712 B1 | 8/2001 | Welch et al. |
| 6,325,410 B1 | 12/2001 | Eyrainer |
| 6,402,189 B1 | 6/2002 | Gray et al. |
| 6,753,057 B1 * | 6/2004 | Gardner, Jr. .................. 428/43 |
| 7,139,650 B2 | 11/2006 | Lubischer |
| 2002/0060447 A1 | 5/2002 | Acker et al. |
| 2002/0164528 A1 | 11/2002 | Sunagawa et al. |
| 2003/0011174 A1 | 1/2003 | Merrifieid et al. |
| 2004/0155441 A1 | 8/2004 | Hoffman |
| 2004/0164531 A1 | 8/2004 | Riha et al. |
| 2004/0199319 A1 | 10/2004 | Lubischer |
| 2005/0040629 A1 | 2/2005 | Chausset |
| 2005/0052005 A1 | 3/2005 | Lunt et al. |
| 2005/0215143 A1 | 9/2005 | Hehn |

FOREIGN PATENT DOCUMENTS

| | | |
|---|---|---|
| DE | 19648138 A1 | 5/1998 |
| DE | 198 19 537 A1 | 11/1998 |
| DE | 198 00 815 C1 | 2/1999 |
| DE | 19944371 A1 | 3/2001 |
| DE | 101 17 938 A1 | 4/2001 |
| DE | 101 04 036 A1 | 8/2001 |
| DE | 101 35 224 A1 | 7/2002 |
| DE | 102 29 962 A1 | 1/2004 |
| DE | 10241715 A1 | 3/2004 |
| DE | 103 15 662 A1 | 10/2004 |
| DE | 103 61 581 A1 | 7/2005 |
| DE | 102004014942 A1 | 10/2005 |
| EP | 0827867 A1 | 7/1997 |
| EP | 0916555 A | 5/1999 |
| EP | 1 445 156 A1 | 11/2003 |
| FR | 2 721 876 A1 | 1/1996 |
| FR | 2792271 A | 10/2000 |
| FR | 2799700 A1 | 4/2001 |
| JP | 05162598 A * | 6/1993 |
| JP | 0827409 | 1/1996 |
| WO | WO 97/03866 | 2/1997 |
| WO | WO 2004/087473 A | 10/2004 |

OTHER PUBLICATIONS

European Search Report EP06004408, dated May 2, 2006.
European Search Report EP06004409, dated May 3, 2006.
European Search Report EP06011961, dated Oct. 10, 2006.
Office action dated Nov. 1, 2007 from U.S. Appl. No. 11/368023.

* cited by examiner

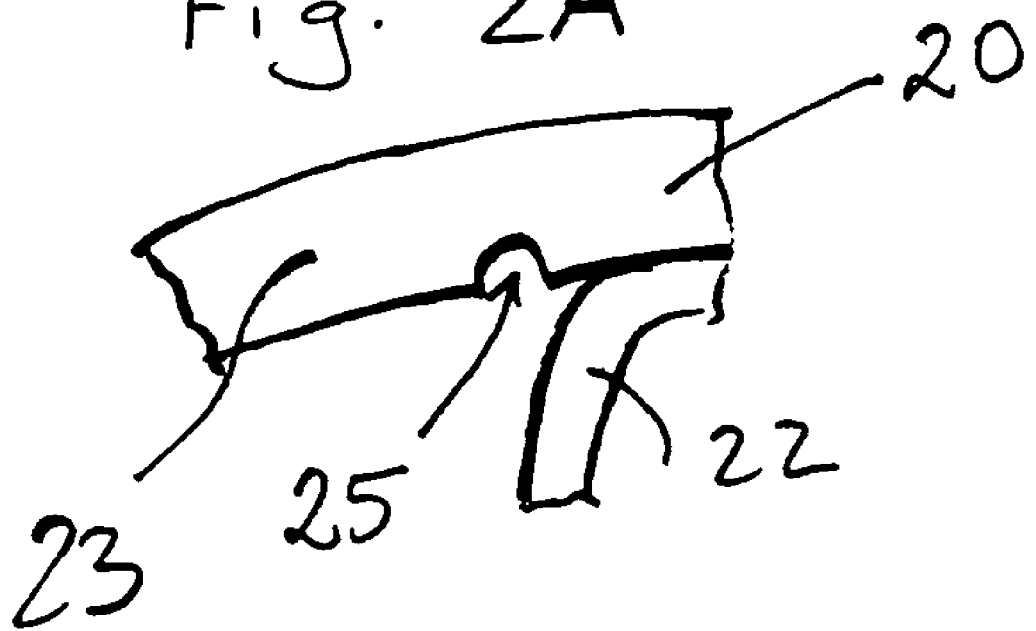

VEHICLE DOOR TRIM AND METHOD FOR THE MANUFACTURE THEREOF

BACKGROUND

1. Field

Aspects of the invention relate to a vehicle door trim for a motor vehicle with a head impact protection device and a method for the manufacture thereof.

2. Discussion of Related Art

Side impact protection devices (often referred to as side airbags) are used in motor vehicles. When actuated by sensor control, side impact protection is intended to protect the pelvic and thoracic areas of the occupant of a motor vehicle. Head impact devices are increasingly being used in motor vehicles as well. Such head impact protection devices (often referred to as headbags) serve to protect the head of a motor vehicle occupant from impacting with the side window.

Conventionally, head impact protection devices are built into the roof liner of vehicles and comprise one or more gasbags which deploy from the roof area of a vehicle on actuation of the protective device.

In motor vehicles where it is not possible to accommodate a head impact protection device in the roof area, such as in open-top convertibles, the gasbags or airbags of a head impact protection device must be built into the area of the door side trim.

The interior trim of a standard door structure comprises an armrest below which is found the area in which a storage pocket is often located. Above the armrest is what is known as the center section of the door trim. The transition area between the center section and the top side of the door trim (the curved area between the center section and the essentially horizontally disposed transition area between the door trim and the side window) is referred to as the curb.

U.S. Pat. No. 5,231,253 discloses a head impact protection device which deploys after opening of the door trim's center section.

DE 103 15 662 A1 discloses an airbag module attached in the body-in-white area of the door wherein a part of the body-in-white door area also serves as a firing channel for the gasbag being deployed. The gasbag's opening behavior does not depend on the position of the window. For this reason, the gasbag also has a partial constriction in order to stabilize the deployment process and to do away with the need to guide the gasbag along a surface, such as the window for example. The gasbag lid integrated in the vehicle door trim has specific weakening areas along which the vehicle door trim tears open or which serve as a hinge mechanism. The gasbag lid extends over the area of both the curb and also the center section of the vehicle door trim.

EP 1 445 156 A1 describes a side impact protection device for a vehicle occupant in which a prefabricated airbag module consisting of a gasbag with outer casing, gas lance and compressed air source is attached to a side wall of the vehicle door by means of screws. On actuation of the airbag module, the vehicle door trim tears open along its entire length wherein a defined weakening of the trim is provided in the face of the trim at approximately the height of the pivotable top edge area to support this movement. In this case, the weakening may be formed by several contiguous slot-shaped apertures or may be a continuous, v-shaped or semicircular indentation on the substrate part of the trim.

SUMMARY

In one illustrative embodiment, a vehicle door trim for a motor vehicle with a head impact protection device for a vehicle occupant is provided. The door trim includes a head impact protection device having an airbag carrier; an airbag attached on a rim side of the airbag carrier and constructed and arranged to be airtight; and a gas generator permanently attached to the airbag carrier. The door trim also includes a curb carrier having at least one fixing attachment constructed and arranged to fix the head impact protection device in an area in the assembled position of the vehicle door trim close to a side window of a driver's door; and a cover area covering the head impact protection device. The door trim also includes a foam layer disposed over the curb carrier; and a decorative layer disposed on the side of the foam layer facing away from the curb carrier. The foam layer is sufficiently elastic to be deformable on actuation of the head impact protection device. The cover area has a material weakening constructed and arranged such that, on actuation of the head impact protection device, the cover area tears open in the area of the material weakening.

In another illustrative embodiment, a method for pre-assembly of a vehicle door trim is provided. The door trim includes a head impact protection device having an airbag carrier; an airbag attached on a rim side of the airbag carrier and constructed and arranged to be airtight; and a gas generator permanently attached to the airbag carrier. The door trim also includes a curb carrier having at least one fixing attachment constructed and arranged to fix the head impact protection device in an area in the assembled position of the vehicle door trim close to a side window of a driver's door; and a cover area covering the head impact protection device. The door trim also includes a foam layer disposed over the curb carrier; and a decorative layer disposed on the side of the foam layer facing away from the curb carrier. The foam layer is sufficiently elastic to be deformable on actuation of the head impact protection device. The cover area has a material weakening constructed and arranged such that, on actuation of the head impact protection device, the cover area tears open in the area of the material weakening. The method includes installing the head impact protection device on the curb carrier of the vehicle door trim; and back-foaming a skin on the curb carrier.

In yet another illustrative embodiment, a method for pre-assembly of a vehicle door trim is provided. The door trim includes a head impact protection device having an airbag carrier; an airbag attached on a rim side of the airbag carrier and constructed and arranged to be airtight; and a gas generator permanently attached to the airbag carrier. The door trim also includes a curb carrier having at least one fixing attachment constructed and arranged to fix the head impact protection device in an area in the assembled position of the vehicle door trim close to a side window of a driver's door; and a cover area covering the head impact protection device. The door trim also includes a foam layer disposed over the curb carrier; and a decorative layer disposed on the side of the foam layer facing away from the curb carrier. The foam layer is sufficiently elastic to be deformable on actuation of the head impact protection device. The cover area has a material weakening constructed and arranged such that, on actuation of the head impact protection device, the cover area tears open in the area of the material weakening. The method includes installing the head impact protection device on the curb carrier of the vehicle door trim; generating a foam layer in a closed mold; and applying the decorative layer onto the foam layer.

In still another illustrative embodiment, a vehicle door trim for a motor vehicle is provided. The vehicle door trim is adapted to cooperate with a head impact protection device for a vehicle occupant. The door trim includes a curb carrier comprising at least one fixing attachment constructed and arranged to fix the head impact protection device, and a cover area adapted to cover the head impact protection device. The cover area has a weakened area constructed and arranged such that, on actuation of the head impact protection device, the cover area tears open at the weakened area. The weakened area is adapted to be disposed on the cover facing away from the vehicle occupant area. A cushion layer is disposed over the curb carrier and adapted to be move on actuation of the head impact protection device.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 2A is an enlarged view of the area encircled by line 2A of FIG. 2;

DETAILED DESCRIPTION

Figure 1:
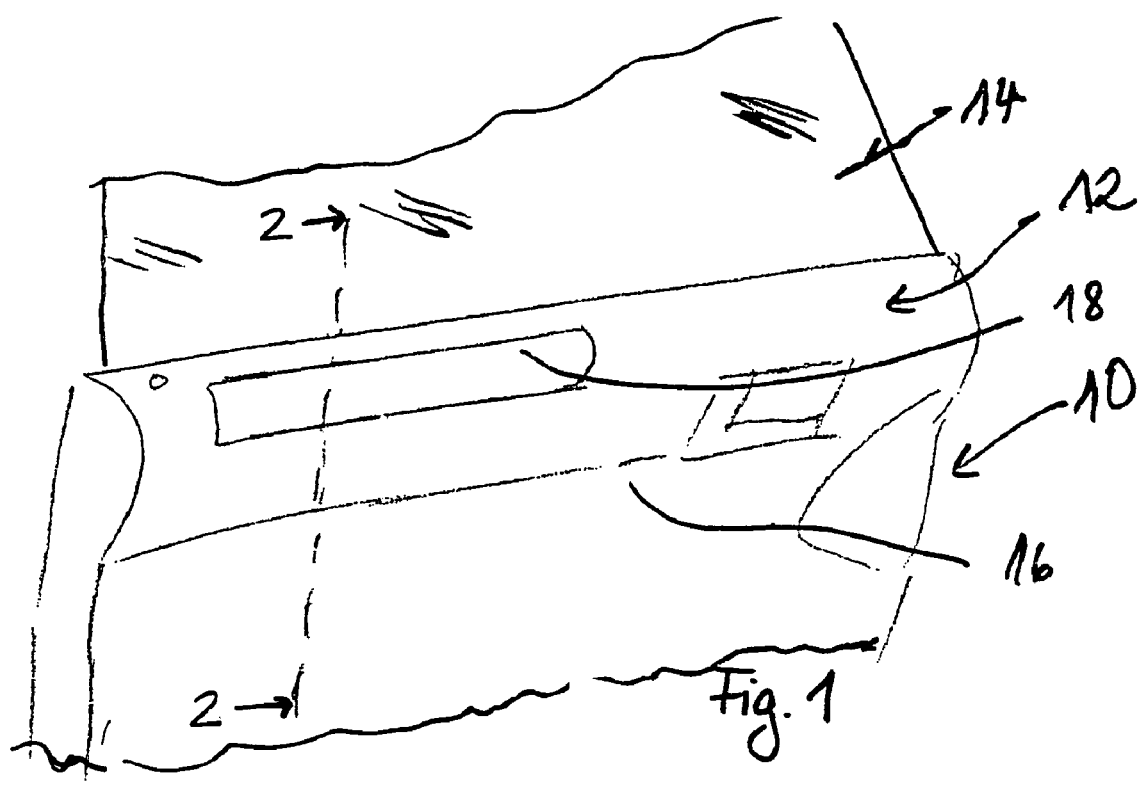
FIG. 1 is a schematic diagram of a part of a vehicle door showing the position of a head impact protection device.

Aspects of the invention relate to a vehicle door for a motor vehicle such that it is possible to integrate a head impact protection device that is not visible to a vehicle occupant. Also, assembly of the vehicle door should be particularly easy.

In one embodiment, a vehicle door trim for a motor vehicle with a head impact protection device for a vehicle occupant is provided. The door trim includes a curb carrier, a head impact protection device, a foam layer over the curb carrier and an airbag carrier of the head impact protection device. A decorative layer on top of the foam layer may be employed. The foam layer is sufficiently elastic to be deformable on actuation of the head impact protection device.

The head impact protection device, which in ordinary parlance corresponds to a headbag but not to a side airbag, in one embodiment, includes an airbag carrier joined to the curb carrier so as to be airtight, an airbag which is attached to the rim side on the airbag carrier so as to be airtight and a gas generator which is permanently attached to the airbag carrier. Thus, the head impact protection device represents a production module wherein the airbag carrier, the airbag and also the gas generator are provided as a unit. The airbag carrier is joined so as to be airtight with the curb carrier, i.e., the entire module is connected with at least one fixing attachment of the curb carrier.

In one embodiment, the foam layer extends completely over the curb carrier. The curb carrier may include a cover area which covers the head impact protection device. In this manner, a continuous foam layer is provided and the position of the cover area over the head impact protection device is not easily detectable. The same applies to the decorative layer provided over the foam layer on the side facing away from the curb carrier. The decorative layer is also designed such that a vehicle occupant cannot readily detect where the head impact protection device integrated in the vehicle door trim is located. In one embodiment, an externally detectable weakening is not necessary because the pliable foam layer easily deforms on actuation of the head impact protection device.

In one embodiment, the cover area forming a part of the curb carrier has a weakening of the material. In this manner, the cover area tears open in the area of the weakened material on actuation of the head impact protection device. Due to the adequate elasticity of the foam layer provided with the decorative layer, in one embodiment, it is thus only necessary to provide the cover area as a component part of the curb carrier with a specific weakening of the material which serves as the target tear point in the event that the airbag is deployed.

In one embodiment, the vehicle door trim is provided with the pre-assembled head impact protection system. Thus, the vehicle door trim can be inserted as a whole during door assembly. Additional fixing of the airbag carrier to the body-in-white of the vehicle door is merely optional. Further, additional assembly steps with appropriate shaping, e.g. on provision of a hook-shaped fixing attachment on the airbag carrier which encompasses the body-in-white of the vehicle door or a structural element linked thereto, need not be employed.

In one embodiment, the procedure for pre-assembly of a vehicle interior door trim comprises the following steps. The head impact protection device is fixed to the curb carrier of the vehicle door trim. A skin on the curb carrier is backed with foam. In this regard, the foam is applied between two mold carriers whereby one mold carrier carries the curb carrier and the other mold carrier carries the decorative layer.

Alternatively, instead of the back-foaming of a skin on the curb carrier, it is also possible to generate the foam layer in a closed mold and to apply the decorative layer to the foam layer in a separate step. In one embodiment, this may be performed by bonding or lamination.

In one embodiment, the head impact protection device has at least one fixing device for creating a connection to the body-in-white of the vehicle door. In one embodiment, the fixing device may be a hook-shaped section of the airbag carrier. In the assembled state, this can encompass a part of the door seal linked to the body-in-white of the vehicle door. In this alternative embodiment, the optionally desired connection between the head impact protection device and the body-in-white of the vehicle door is generated automatically during installation of the completely pre-assembled vehicle door trim. No additional work step need be performed. It should be appreciated that the present invention is not limited in this respect. In one embodiment, the airbag carrier can also be provided with a fixing lug which is screwed to the body-in-white of the vehicle door. In this embodiment, the head impact protection device may be located only in the curb area of the vehicle door trim. Thus, the curb area of the vehicle door trim can be assembled first, after which the airbag carrier can be screwed to the body-in-white of the vehicle door by way of the lug attached to the carrier. The other main components of the door's interior trim, such as the center section, armrest and map pocket, can be subsequently assembled. However, in one embodiment, one or a plurality of these components can be connected to the curb area in one piece. Thus, only the center section of the door trim need be fixed in place subsequently. In this manner, in the event of a repair, easier access to components in the door structure may be provided without having to remove the entire door trim.

In one embodiment, the airbag carrier has a first gas-tight sealed chamber pointing away from the foam layer in which chamber the gas generator is disposed.

In one embodiment, the material weakening of the cover area represents a tear line. The tear line may be generally U-shaped whereby, in the assembly position, the base of the U-shape runs substantially parallel and close to the side window of the vehicle door, whereas the two arms of the U-shape extend from the end areas of the base of the tear line and substantially vertical to the base in a direction away from the side window up to the end points predetermined by the overall size of the head impact protection device. As will also become apparent in the following description of the Figures, both for the extension of the head impact protection device and for the associated arrangement of the tear lines, the tear lines only extend over a relatively small part of the vehicle door's overall length and also only in the curb area of the door trim.

By providing a U-shape it is possible to control the opening of the cover area and thus to influence the deployment and exit direction of the airbag. Because the U-shape is disposed so that the center section of the U (i.e. the base of the U-shape) is located parallel and close to the side window of the vehicle door, it follows that the airbag also extends in the immediate vicinity of the side window of the vehicle door and in an upward direction from the curb area.

In one embodiment, the vehicle door trim comprises a further weakening of the wall thickness of the cover area in an area which is located substantially between the end points of the tear line. This further weakening of the wall thickness can be designed such that it acts not as a tear line but rather as a target bending point in much the same way as a hinge enables the wide opening movement of the cover area in the event that the head impact protection device is actuated.

In one embodiment, the material weakening is formed by injection molding, i.e., the material weakening is already formed during the process of injection molding the curb carrier. It should be appreciated that the present invention is not limited in this respect as it is also possible to create the material weakening in a subsequent work step, e.g. with a laser device or by mechanical creation or indentation of a groove. Material weakening may also take place in the course of fabricating the curb carrier. Other suitable methods may be employed, as the present invention is not limited in this respect.

In one embodiment, the material weakening is formed on the side of the curb carrier facing away from the foam layer. In one embodiment, the weakening is formed as a reduction in the wall thickness of the curb carrier. The position of the material weakening on the side facing away from the foam layer ensures that the head impact protection device is not detectable from the passenger compartment. Detection may be limited even after pressure has been applied to the foam layer, which might result in a material weakening located on the side of the curb carrier facing towards the foam layer.

In one embodiment, the cover area integrally formed with the curb carrier has a plurality of line-shaped material weakening areas running substantially parallel to each other. In one embodiment, these line-shaped material weakening areas also run substantially parallel to the base of the U-shape. The additional, line-shaped material weakening areas assist bending of the cover area in the event that the head impact protection system is actuated. In one embodiment, as a result of the plurality of material weakening areas running substantially parallel to each other, a louver-like structure is generated, facilitating a slight flexibility of the individual strip-shaped sections in relation to each other between two material weakening areas respectively. Due to the arrangement of the adjustable material weakening areas and with reference to the extent of material weakening, it is possible to adjust the deformation of the cover area under the compressive force resulting from air bag deployment.

In addition or alternatively, in one embodiment, the cover area is formed in one piece with the curb carrier such that it has a material thickness that decreases toward at least a part of the tear line. This also serves to control the bending behavior of the cover area under the compressive stress typically present during airbag deployment.

In the previously described embodiments, the material weakening of the cover area was created by presetting the wall thickness in some areas of the cover area. Alternatively, however, it is also possible to create the material weakening by an arrangement of at least one reinforcing layer, such as fabric, present in the cover area, as the present invention is not limited in this respect. For example, in an embodiment, the reinforcing layer may not extend into the area of material weakening and in this way, the reinforcing layer may influence the local strength of the material of the cover area without a change in the wall thickness. The provision of at least one reinforcing layer is not, however, to be seen purely as an alternative to the provision of material weakening in the form of a reduction in wall thickness. Both measures may be provided simultaneously and complement each other in their effect, as the present invention is not limited in this respect.

In one embodiment, a plurality of reinforcing layers is provided. In one embodiment, the reinforcing layers are extrusion coated in the cover area whereby the bending behavior of the cover area is adjusted by specific extension of the individual reinforcing layers. In other words, a plurality of fabric layers is disposed in those regions of the cover area where high rigidity is desired, whereas in regions with only a single layer of fabric, the cover area is more easily deformable.

According to one embodiment, the curb carrier has at least two fixing attachments which are located on the side facing away from the foam layer starting out from the curb carrier. However, the present invention is not limited in this respect, as three or four fixing attachments may be provided. In one embodiment, the fixing attachments can fulfill a dual function in that it can attach the module of the head impact protection device and form a firing channel for the airbag.

In one embodiment, the head impact protection device is designed such that it can be attached to the curb carrier in a single work step as a complete structural unit comprising the airbag carrier, the airbag and the gas generator. This enables a high level of integration in the area of the door trim.

In one embodiment, the airbag carrier is welded to the curb carrier. The provision of a welded joint represents an easy alternative for creating an airtight and permanent joint between airbag carrier and curb carrier. Alternative joining arrangements may be employed, as the present invention is not limited in this respect. For example, the airbag carrier and curb carrier can be bonded together.

In one embodiment, the decorative layer comprises a plastic film. In this case, the plastic film can be selected based on the desired visual and tactile properties.

According to one embodiment, the decorative layer comprises leather, imitation leather or textile material, which may be bonded to or stretched over the foam layer. In this embodiment, the foam is formed in a sealed mold and the decorative layer is applied onto the foam layer in a separate production step.

Turning now to the Figures, identical structural elements or structural elements corresponding to each other are referred to by the same reference numbers in each case.

FIG. 1 shows the general construction of the inside of a vehicle door. In this regard, the vehicle door generally referred to by the reference number 10 is only represented in part and in particular in the vicinity of curb 12 which represents the area of the door trim situated closest to side window 14. As used herein, the area of the curb is that area in which is located the transition between the center section 16 disposed above an armrest (not shown) and the closure area of the vehicle door trim and which runs essentially horizontally in the direction of side window 14.

Attachment area 18 of the head impact protection device is shown in the schematic diagram of FIG. 1. However, as mentioned, in one embodiment, the head impact protection device is not detectable by the vehicle occupant. Rather, FIG. 1 shows that the exit area of the airbag does not extend over the entire length of the vehicle door and also that, in one embodiment, it is disposed exclusively in the area of curb 12. Center section 16 may include a side impact protection device.

Figure 2:
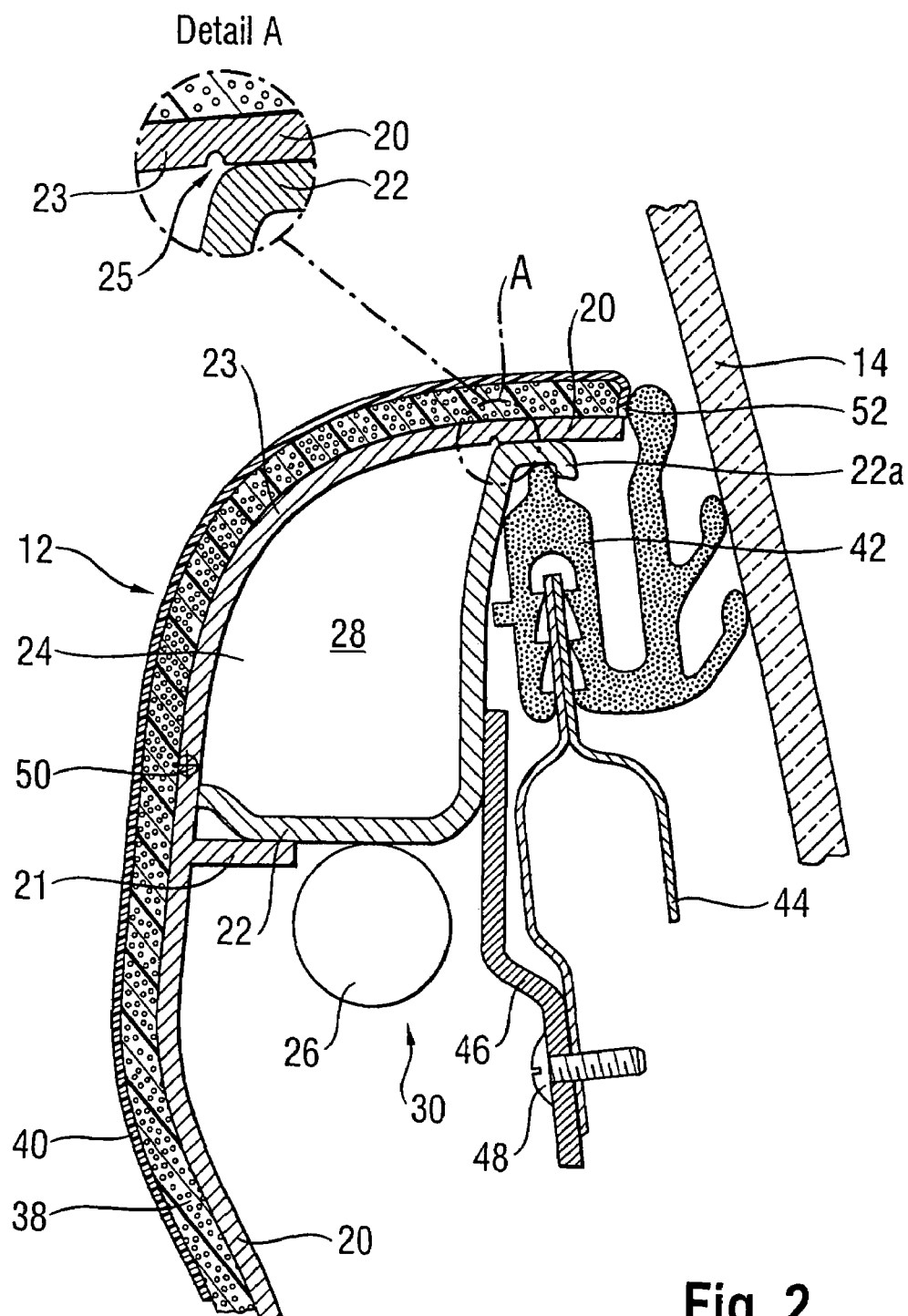
FIG. 2 is a horizontal sectional schematic view taken along line 2-2 of FIG. 1.
Figure 3:
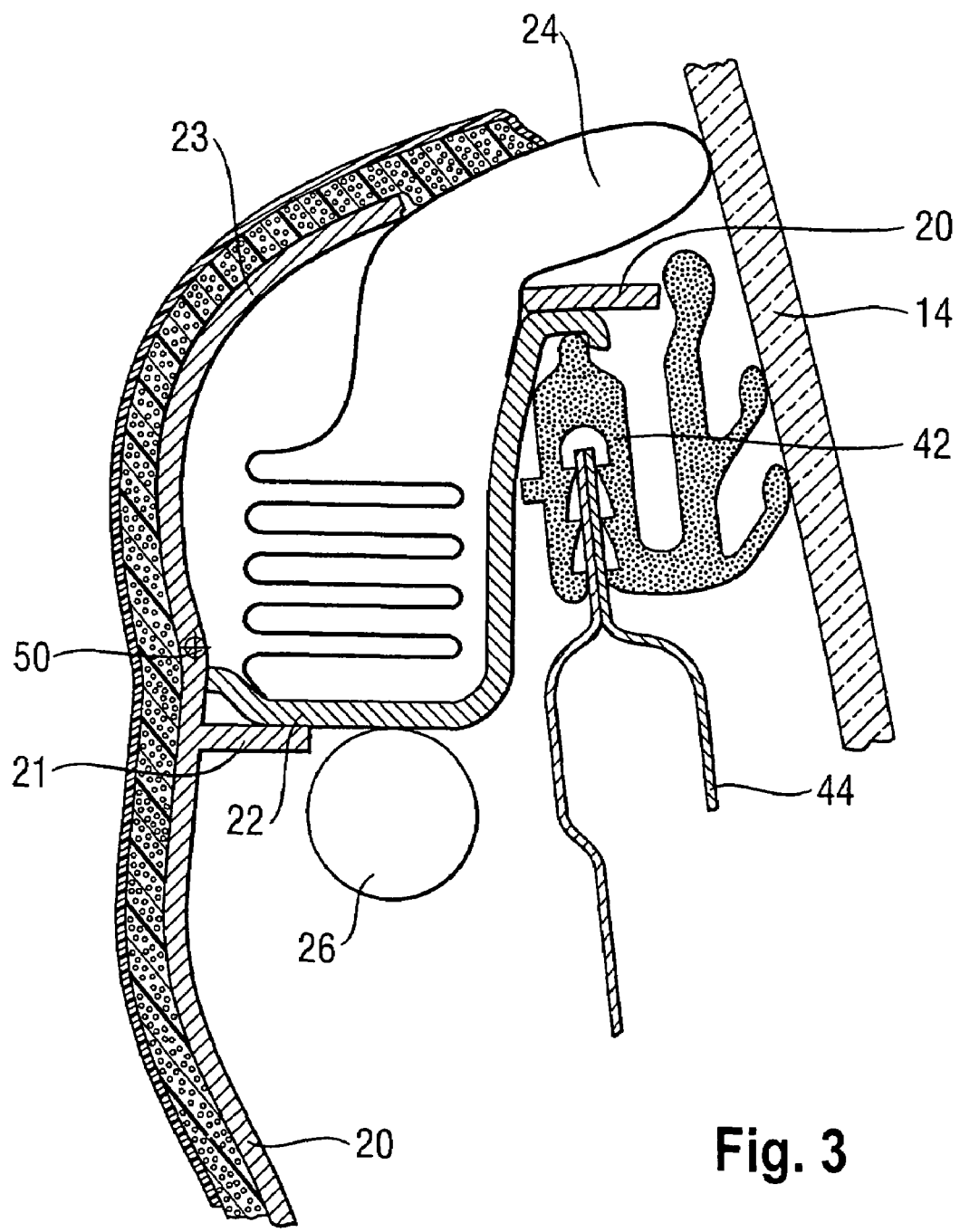
FIG. 3 is a view of FIG. 2 during actuation of the head impact protection device.

In each of FIGS. 2 and 3, a vertical section is shown through the door structure taken along the line 2-2 of FIG. 1. All the features in the following description may be applicable to any entry door of a motor vehicle, (i.e., the driver's door, the passenger door or the rear doors).

FIG. 2 shows curb carrier 20 having a fixing attachment 21 for attaching the head impact protection device 30. Head impact protection device 30 includes an airbag carrier 22, an airbag 24 and a gas generator 26, which are integrated into head impact protection device 30.

In one embodiment, both curb carrier 20 and airbag carrier 22 are preferably injection molded parts that may be made, for example, of ABS and/or PC. In the overlap area shown between curb carrier 20 and airbag carrier 22, in one embodiment, they are joined together so as to be airtight. In one embodiment, they may be welded or bonded together.

Airbag carrier 22 has a first chamber 28 which is sealed towards the outside of the door so as to be gastight. The folded airbag 24 (see FIG. 3) is located in first chamber 28. Gas generator 26 is attached on airbag carrier 22. Any gas generator that provides the necessary volume of gas required for airbag deployment can be used, as the present invention is not limited in this respect. The gas generator can likewise also be provided inside first chamber 28. A foam layer 38, which may be made of PU foam, is located on curb carrier 20. The door trim facing towards the interior of the vehicle is formed by a decorative layer 40 applied to foam layer 38.

As is further apparent from FIG. 2, the airbag carrier is provided with a fixing tongue 22A which encompasses a door seal 42. Door seal 42 is pushed onto the body-in-white of the vehicle door, which may be made of metal, although the inventive aspects are applicable to vehicle doors made of other materials. In one embodiment, airbag carrier 22 is fixed to body-in-white 44 without requiring a separate process step for fixing. The appropriate attachment is effected automatically upon attaching the vehicle door trim.

In one embodiment, curb carrier 20 is continuous in cover area 23 in which the airbag carrier is attached. In this embodiment, cover area 23 is defined between an area of curb carrier 20 which, as is shown in FIG. 3, can be designated as rotary axis 50 of cover area 23, and a material weakening 25, which is clearly shown in FIG. 2A. From the enlarged view of FIG. 2A, it also becomes clear that, in one embodiment, cover area 23 is not a separate component, but rather a one-piece component of curb carrier 20. Cover area 23 may be defined as a partial area of curb carrier 20 in that it is located between functional areas that possess a special effect in the event of the head impact protection device being actuated. In the sectional diagram of FIG. 2, it is possible to discern material weakening 25 and area 50 serving as a rotary axis or hinge. However, to facilitate a desired opening of cover area 23 on actuation and deployment of the airbag, further material weakenings, not shown in the sectional diagram of FIG. 2, are provided. These further weakenings extend in the area of the end points of material weakening 25 running vertically to the drawing plane of FIG. 2 and that run right up into the area of rotary axis 50. The position of the head impact protection device indicated schematically in FIG. 1 in the area of the curb could thus also represent the position of axis 50 and weakening 25 parallel to it. Further material weakening areas at the end points of weakening 25, which extend into the area of axis 50, together with axis 50 and weakening 25 define an essentially rectangular area corresponding to cover area 23 (see FIG. 1).

Material weakening 25 functions as a specific tear point. As material weakening 25 is disposed on the side of curb carrier 20 facing away from foam layer 38, it is not possible for a vehicle occupant to detect the position of these weakening areas.

FIG. 3 shows the actuation of the head impact protection device. A sensor (not illustrated) may be employed to activate the airbag. As is known, airbag 24 deploys due to the gas released by gas generator 26. In one embodiment, foam layer 38 and decorative layer 40 connected to the foam layer lift off cover area 23. No separate material weakening is required in foam layer 38 or decorative layer 40 because, due to the elasticity of the foam layer, said layer deforms as a result of the pressure of the deploying airbag. The airbag can thus be deployed in the immediate vicinity of side window 14 and in an upward direction. In this embodiment, airbag carrier 22 and curb carrier 20 outside cover area 23 remain in their positions—only cover area 23 and the unit including foam layer and decorative layer is deformed to such an extent under the pressure of airbag 24 as it fills that it can exit upwards, thereby functioning as a head impact protection device.

To increase the stability, in one embodiment, airbag carrier 22 can optionally be permanently connected to body-in-white 44 by way of a lug 46 permanently attached (e.g., welded or bonded) to the carrier using a connecting element 48. Screws, fixing clips or other suitable fasteners may be used as joining element 48. The provision of lug 46 is optional, as the present invention is not limited in this respect. In one embodiment, head impact protection device 30 can be pre-assembled as part of the whole vehicle door trim and can be attached in the vehicle door in one work process on installation of the vehicle door trim.

Rotary axis 50 may be formed by a specific weakening of the material. In one embodiment, this weakening is created during injection molding of head impact protection device 30.

On actuation of the head impact protection device, foam layer 38 is cut through in the area of the curb carrier. Decorative layer 40, which, in one embodiment, can be provided with a folded edge part 52 in the immediate vicinity of side window 14, is pulled out of the folded edge part by airbag 24 as it deploys.

In the area of rotary axis 50, in one embodiment, a material weakening is provided, although the invention is not limited in this respect. In one embodiment, weakening area 25 and rotary axis 50 are constructed and arranged such that cover area 23 does not tear in the area of rotary axis 50; otherwise, desired exit geometry of the airbag shown in FIG. 3 may not be possible.

A difference exists between FIGS. 2 and 3 in that in FIG. 3 the lug described above and attachment 48 on body-in-white 44 of the vehicle door was omitted. This is intended to show clearly that this is an optional feature and the structural unit of the door trim consisting of the curb and the module of the head impact protection device can also be inserted without such additional attachment to the body-in-white of the vehicle door.

Figure 4:
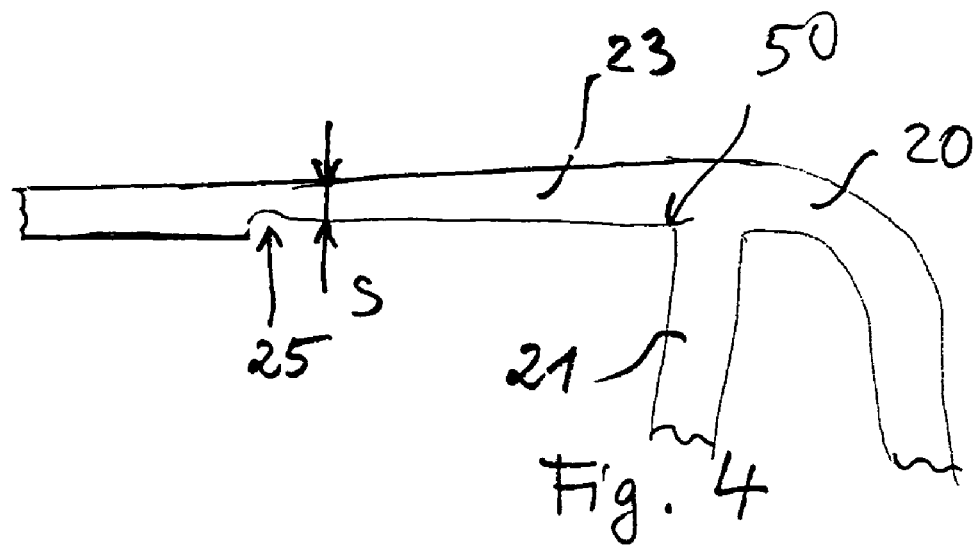
FIG. 4 is a schematic detail view of the cover area of the curb carrier of an alternative embodiment.
Figure 5:
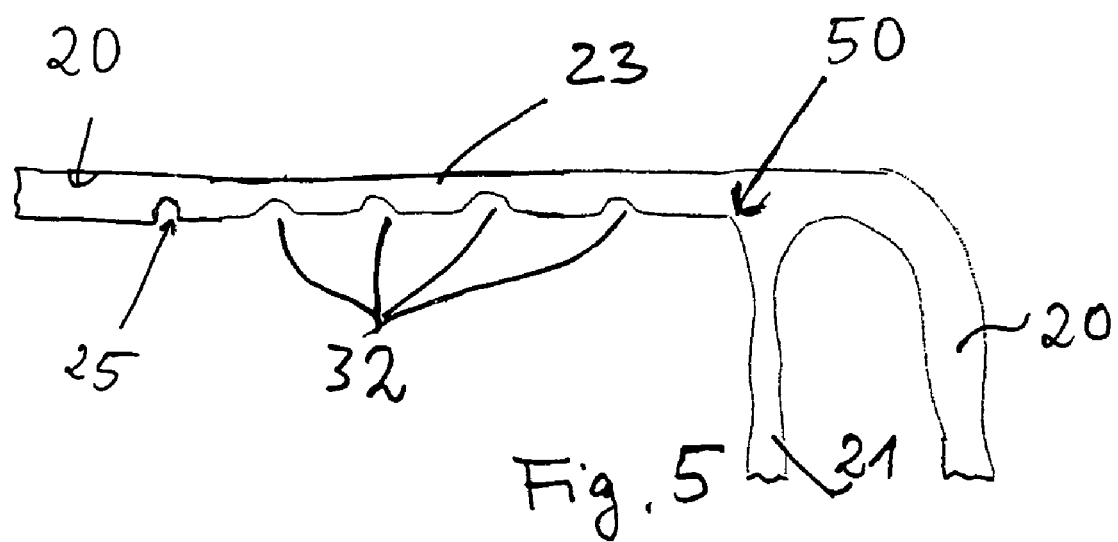
FIG. 5 is a schematic detail view of the cover area of the curb carrier according to a further alternative embodiment.

In the alternative embodiments of the invention shown in FIGS. 4 and 5, only cover area 23 of curb carrier 20 is shown. In the embodiment shown in FIG. 4, fixing attachment 21 acting as firing channel and the areas of curb carrier 20 connecting to cover area 23 are shown schematically. In the embodiment shown in FIG. 4, no material weakening is provided in the area of the rotary axis. Rather, in this embodiment, a specific material weakening is provided in the area of tear line 25, which breaks on deployment of the airbag disposed under cover area 23 (in the drawing planes of FIGS. 4 and 5) and allows cover area 23 to bend upwards. In order to facilitate a desired bending behavior of cover area 23, in one embodiment, wall thickness S of the cover area reduces continuously towards tear line 25. As discussed above, tear line 25 is preferably formed in a U-shape. However, the reduction of the wall thickness of cover area 23 takes place between imaginary rotary axis 50 and that section of tear line 25 which is disposed substantially parallel to imaginary rotary axis 50.

The material reduction (i.e., reduction of the wall thickness S between rotary axis 50 and the section of tear line 25 running parallel to it) need not be linear. The wall thickness profile of cover area 23 can be constructed to cause a desired bending behavior.

In the embodiment of the invention shown in FIG. 5 (which likewise schematically shows cover area 23 in connection with curb carrier 20), cover area 23 is provided with a plurality of line-shaped weakening areas 32 running substantially parallel to each other and substantially parallel to rotary axis 50. Line-shaped weakening areas 32 influence the bending behavior of the cover area in such a manner that, on an application of pressure by the airbag as it deploys, the cover area bends increasingly along line-shaped weakenings 32 and thus the cover area is able to bend upwards like a louver.

In the embodiments according to FIGS. 4 and 5, the tear line or the line-shaped weakenings are disposed in each case on the side of cover area 23 facing towards the airbag. Not shown in both Figures is the foam layer disposed over curb carrier 20 and also over cover area 23. Cover area 23 is covered by a decorative layer. As discussed above, on actuation, the head impact protection device tears open the foam, which can be deformed together with the decorative layer due to its elasticity. It should be appreciated that the foam layer disposed over cover area 23 exhibits a certain deformation resistance. Accordingly, this resistance should be taken into account when constructing the material weakening of cover area 23.

In one embodiment, the manufacturing sequence of the vehicle door trim assumes that the entire head impact protection device is provided as a module and is attached to the curb carrier of the vehicle door trim before attachment of the foam and decorative layers. A skin is subsequently foamed onto the curb carrier.

In one embodiment, the interior vehicle door trim can be provided with a completely pre-assembled module of the head impact protection device.

As mentioned above, the airbag described herein is referred to as a headbag for protection of an occupant's head and not what it known as side impact protection. For this reason, in one embodiment, the head impact protection device is disposed in the curb carrier (i.e., in the topmost area of the vehicle door trim). This allows a very rapid response time to be achieved on deployment of the airbag. In addition, in one embodiment, the volume of the airbag can be smaller than if it were attached in the center section of the vehicle door trim.

It should be appreciated that various combinations of the above-described embodiments can be employed together, but several aspects of the invention are not limited in this respect. Therefore, although the specific embodiments disclosed in the figures and described in detail employ particular combinations of features, it should be appreciated that the present invention is not limited in this respect, as the various aspects of the present invention can be employed separately, or in different combinations. Thus, the particular embodiments described in detail are provided for illustrative purposes only.

It should also be appreciated that a variety of features employed in the art of vehicle manufacture may be used in combination with or to modify the above-described features and embodiments.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A vehicle door trim for a motor vehicle with a head impact protection device for a vehicle occupant, the door trim comprising:
   (a) a head impact protection device comprising:
      (i) an airbag carrier having a rim edge;
      (ii) a layer of airbag fabric having an edge area, the edge area of the airbag fabric attached to the rim edge of the airbag carrier in an airtight manner; and
      (iii) a gas generator permanently attached to the airbag carrier;
   (b) a curb carrier comprising:
      (i) at least one fixing attachment constructed and arranged to fix the head impact protection device in an area in the assembled position of the vehicle door trim close to a side window of a driver's door; and
      (ii) a cover area covering the head impact protection device;
   (c) a foam layer disposed over the curb carrier;
   (d) a decorative layer disposed on the side of the foam layer facing away from the curb carrier; whereby
   (e) the foam layer is sufficiently elastic to be deformable on actuation of the head impact protection device; and
   (f) the cover area has a material weakening constructed and arranged such that, on actuation of the head impact protection device, the cover area tears open in the area of the material weakening.

2. The vehicle door trim according to claim 1, wherein the airbag carrier has a first chamber sealed so as to be gastight on the side away from the foam layer, and the fabric of the airbag is folded and disposed within the chamber.

3. The vehicle door trim according to claim 1, wherein the material weakening represents a generally U-shaped tear line whereby in the assembly position, the base of the U-shape runs substantially parallel and close to the side window of the vehicle door whereas the two arms of the U-shape extend from end areas of a base of the tear line and substantially vertical to the base in a direction away from the side window and up to end points.

4. The vehicle door trim according to claim 3, further including a further weakening of the wall thickness of the cover area in an area located substantially between the end points of the tear line.

5. The vehicle door trim according to claim 1, wherein the material weakening on the side of the curb carrier facing away from the foam layer is formed as a local reduction of the wall thickness of the curb carrier.

6. The vehicle door trim according to claim 1, wherein the cover area formed in one piece with the curb carrier has a plurality of line-shaped material weakening areas which run substantially parallel to each other.

7. The vehicle door trim according to claim 1, wherein the cover area formed in one piece with the curb carrier has a material thickness S which decreases toward at least one part of the material weakening representing a tear line.

8. The vehicle door trim according to claim 1, wherein the material weakening is formed by at least one reinforcing layer, present in the cover area which does not extend into the area of the material weakening.

9. The vehicle door trim according to claim 8, wherein a plurality of reinforcing layers are provided which are injection coated in the cover area whereby the bending behavior of the cover area is adjusted based on the material of the individual reinforcing layers.

10. The vehicle door trim according to claim 1, wherein the curb carrier has at least two fixing attachments which form a firing channel for the head impact protection device.

11. The vehicle door trim according to claim 1, wherein the head impact protection device is adapted to be attached in a single work step to the curb carrier as a complete structural unit including the airbag carrier and the layer of airbag fabric and the gas generator attached to the airbag carrier.

12. The vehicle door trim according to claim 1, wherein the airbag carrier is welded to the curb carrier.

13. The vehicle door trim according to claim 1, in combination with a vehicle door, wherein the airbag carrier is bonded to the curb carrier.

14. The vehicle door trim according to claim 1, wherein the decorative layer comprises a plastic film.

15. The vehicle door trim according to claim 1, wherein the decorative layer comprises one of leather, imitation leather or textile material, attached to the foam layer.

16. The vehicle door trim according to claim 1, in combination with a vehicle door.

17. The combination according to claim 16, in combination with a vehicle.

18. A method for pre-assembly of a vehicle door trim according to claim 1, comprising:
    (a) installing a head impact protection device on the curb carrier of the vehicle door trim; and
    (b) back-foaming a skin on the curb carrier.

19. A method for pre-assembly of a vehicle door trim according to claim 1, comprising:
    (a) installing a head impact protection device on the curb carrier of the vehicle door trim;
    (b) generating a foam layer in a closed mold; and
    (c) applying the decorative layer onto the foam layer.

20. An assembly comprising:
    a vehicle door trim for a motor vehicle, the door trim comprising:
        a curb carrier comprising at least one fixing attachment constructed and arranged to fix the head impact protection device in an area in the assembled position of the vehicle door trim close to a side window of a driver's door, and a cover area adapted to cover the head impact protection device, the cover area having a weakened area constructed and arranged such that, on actuation of the head impact protection device, the cover area tears open at the weakened area, and wherein the weakened area is adapted to be disposed on the cover facing away from the vehicle occupant area; and
        a cushion layer disposed over the curb carrier and adapted to be move on actuation of the head impact protection device; and
    a head impact protection device for a vehicle occupant, the head impact protection device fixed to the curb carrier, the head impact protection device comprising:
        an airbag carrier having a rim edge; and
        a layer of airbag fabric having an edge area, the edge area of the airbag fabric attached to the rim edge of the airbag carrier in an airtight manner.

21. The vehicle door trim according to claim 20, further comprising a decorative layer disposed on the side of the cushion layer facing away from the curb carrier.

22. A vehicle door trim for a motor vehicle with a head impact protection device for a vehicle occupant, the door trim comprising:
    (a) a head impact protection device comprising:
        (i) an airbag carrier;
        (ii) an airbag attached on a rim side of the airbag carrier and constructed and arranged to be airtight; and
        (iii) a gas generator permanently attached to the airbag carrier;
    (b) a curb carrier comprising:
        (i) at least one fixing attachment constructed and arranged to fix the head impact protection device in an area in the assembled position of the vehicle door trim close to a side window of a driver's door; and
        (ii) a cover area covering the head impact protection device;
    (c) a foam layer disposed over the curb carrier;
    (d) a decorative layer disposed on the side of the foam layer facing away from the curb carrier; whereby
    (e) the foam layer is sufficiently elastic to be deformable on actuation of the head impact protection device;
    (f) the cover area has a material weakening constructed and arranged such that, on actuation of the head impact protection device, the cover area tears open in the area of the material weakening; and
    (g) the head impact protection device has at least one fixing device adapted to create a joint with a body-in-white of the vehicle door.

23. The vehicle door trim according to claim 22, wherein the at least one fixing device encompasses a part of the door seal joined to the body-in-white of the vehicle door in the assembled condition.

* * * * *